March 17, 1959   R. R. MILLER   2,878,465
RADIO PULSE ECHO DEVICE WITH ALARM ACTUATED BY SELECTED ECHOES
Filed May 18, 1953   3 Sheets-Sheet 1
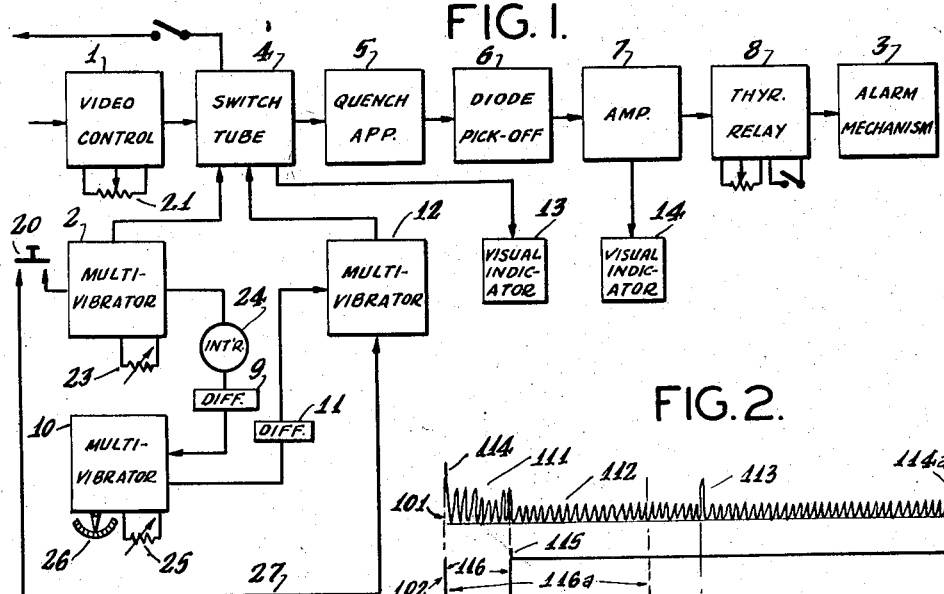
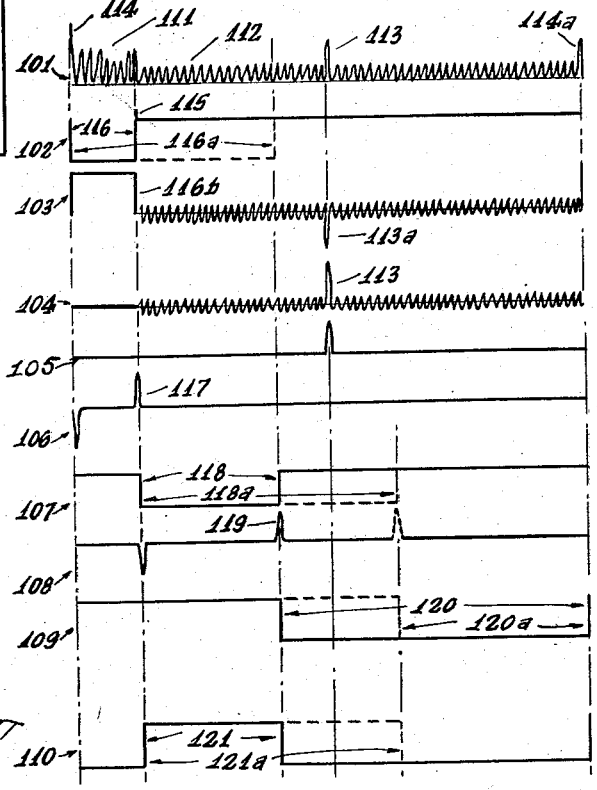
FIG.3.
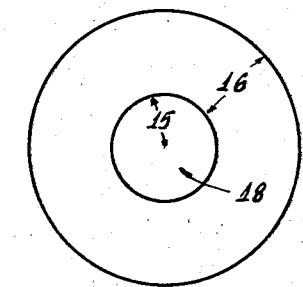
INVENTOR.
RICHARD R. MILLER
BY
H. G. Manning
ATTORNEY.

INVENTOR.
RICHARD R. MILLER
BY
H. G. Manning
ATTORNEY.

March 17, 1959   R. R. MILLER   2,878,465
RADIO PULSE ECHO DEVICE WITH ALARM ACTUATED BY SELECTED ECHOES
Filed May 18, 1953   3 Sheets-Sheet 3

INVENTOR.
RICHARD R. MILLER
BY H. G. Manning
ATTORNEY.

United States Patent Office 2,878,465
Patented Mar. 17, 1959

2,878,465

RADIO PULSE ECHO DEVICE WITH ALARM ACTUATED BY SELECTED ECHOES

Richard R. Miller, Lakeville, Conn.

Application May 18, 1953, Serial No. 355,498

6 Claims. (Cl. 343—5)

This invention relates to electronic alerting devices and more particularly to an alarm system actuated by selected echoes.

This invention relates especially to an alarm actuator having means for differentiating between local identified and insignificant echoes, and new, distant, unidentified and significant echoes, and with selection means to actuate any suitable alarm device.

One object of the present invention is to provide an apparatus of the above nature, in which the alarm actuator has improved stability and dependability.

A further object is to provide an apparatus of the above nature having means to render the pulse echo system alarm actuator more serviceable in its ability to select echoes lying within a predetermined zone.

A further object is to provide an apparatus of the above nature having means to facilitate the adjustment and operation of the alarm actuating mechanism.

A further object is to provide an apparatus of the above nature which will be simple in construction, inexpensive to manufacture, easy to install and manipulate, compact, and very efficient and durable in use.

With these and other objects in view, there have been illustrated on the accompanying drawings, several forms in which the invention may conveniently be embodied in practice.

In the drawings,

Fig. 1 represents a block diagram of one embodiment of the invention.

Fig. 2 is a graphical representation of the voltage variations within one sweep of the "scope" as they occur in the circuits shown in Fig. 1.

Fig. 3 is a representation of a plan position indicator with the pulse echo apparatus located at the central portion thereof and showing another object located at the bottom of said figure.

Figure 4:
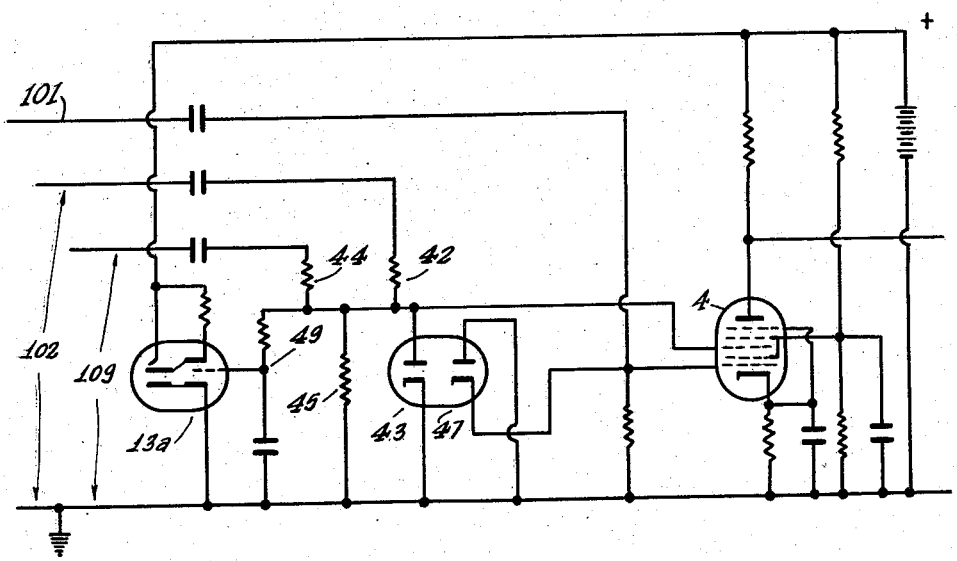
Fig. 4 is a circuit diagram showing means for giving a visual indication of the operation of the third multivibrator shown in Fig. 1, by means of a tube, so as to give an indication of proper zone operation.

This invention is an improvement over the system disclosed in my previous Patent No. 2,521,016, dated September 5, 1950, entitled "Radio Pulse Echo Device With Alarm Actuated by Selected Echoes."

Referring now to the drawings in which like reference numerals denote corresponding parts throughout the several views, the alarm actuator to be used in connection with the present pulse echo system, has been described as a means of blocking out or rendering inoperative for alarm purposes the transmitter pulse and vicinal or unsignificant echoes produced by the receiver of the pulse echo system. This is necessary in order to make use of the response occasioned by a new unidentified echo of significance to the operator of the system.

In carrying out the present invention in a preferred embodiment thereof, a video control circuit of low amplification serves to limit the amplitude of the video reception originating in a pulse echo system, to produce the most efficient operation in the switch tube by maintaining its operation well below the saturation point.

This invention includes a one-shot multivibrator, triggered by the modulation pulse originating in the pulse echo system transmitter, and which generates a negative square wave of adjustable duration, serving to block out the transmitter pulse and vicinal unwanted returns.

For special conditions of operation which will be described as "zone operation," a second one-shot multivibrator, triggered by the trailing edge of the differentiated output of the first multivibrator, will generate a square wave of adjustable duration. The duration of this square wave corresponds to the breadth of the zone in which it is desirable to make a search.

Provision is also made of a third multivibrator of the start-stop type which is triggered by the trailing edge of the output of the second multivibrator, and is stopped by the application of the modulation transmitter synchronizing pulse of the pulse echo system transmitter.

Manually operated switch means are also provided to disable the second and third multivibrators for normal operation of the search equipment under conditions which do not require search within a fixed zone.

The object of the above-mentioned zone operation of the alarm actuator is to employ the device in coastal or closed waters, or for altimeter or fathometer applications, etc., entailing the need to maintain a continual search within predetermined limits. Means are also provided for indicating to the operator the zone in which he may wish to keep watch.

The circuit of Fig. 1 includes a mixer which is a form of a switch tube 4 which serves to combine the output of the video control circuit and the output of the multivibrators 2, 12 in such a manner that the negative polarity square waves produced by the first and third multivibrators holds the switch tube to cutoff, thereby blocking out the video signals occurring in the areas corresponding to their time durations. Such video signals, however, which occur in the area corresponding to the time duration of the second multivibrator 10 will be passed by the switch tube, and any echo signal occurring within that period will be passed, and caused to actuate the alarm relay to give notification to the operator.

A further object of the present invention is to stabilize the operation of the alarm actuator at all times. To this end, D. C. restoration is provided in the grid circuit which introduces the block out square waves to prevent any positive excursions at the trailing edge of said square waves, and likewise positive D. C. restoration is provided at the grid of the video signal input by said switch tube 4. By means of this construction a clear differentiation will be maintained between the block out pulse which will appear positive, and the video signal which will appear negative in the output of said switch tube.

In carrying out this invention, a quenching circuit 5 is introduced after the switch tube 4 to quench the large square waves introduced at negative polarity and appearing in the output of the switch tube 4 as large square waves of positive polarity.

This quenching circuit 5 produces a negative D. C. restoration greatly reducing the amplitude of the large positive square waves but leaving unaffected the video signals of opposite polarity.

An amplifier 7 will be inserted after this D. C. restoration to invert the signal and increase its amplitude.

Figure 5:
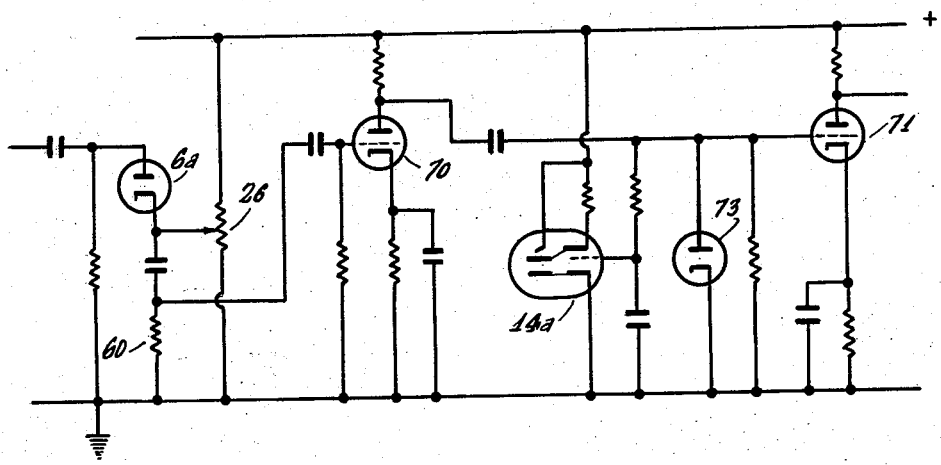
Fig. 5 is another circuit diagram of the same apparatus including a diode pickoff tube, showing means for suppressing the random microphonics and for applying to the thyratron only the significant signals, and also visual indicator means to adjust said diode pickoff circuit.

In the embodiment shown in Fig. 5, a diode pick-off circuit has been inserted to provide a means for selecting an echo signal from the random noise or microphonics. In this apparatus, two stages of amplification are employed to raise the selected signal to a high level of amplitude for the firing of a thyratron 8 employed for the actuation of the relay.

A further improvement of this embodiment of the invention introduces means to facilitate the operation and adjustment of the alarm actuator itself. For this purpose, as a preferred embodiment, a visual indicator tube 13a is inserted in the control grid circuit of the switch tube (Fig. 4) to indicate first, that the modulation pulse of the echo transmitter is triggering the first multivibrator 2, second, that the first multivibrator is operating properly, and third, that under zone operation all three multivibrators 2, 10, 12 are working.

A second visual indicator tube 14a is inserted (Fig. 5) after the first stage of amplification, following the diode pick-off circuit, previously described, to aid in the adjustment of said diode pick-off circuit. Both visual indicator tubes 13a, 14a provide a means of monitoring the overall operation of the alarm actuator.

Referring now to the drawings in which like reference numerals denote corresponding parts throughout the several views, the numeral 1 indicates a video control block unit, similar to that disclosed in my original Patent No. 2,521,016, mentioned above.

The numeral 2 indicates a one shot multivibrator to generate a square wave of negative polarity, and the numeral 4 indicates a switch tube for combining the outputs of the video control 1 and the multivibrator 2. The numeral 5 indicates a quench apparatus and the numeral 8 a thyratron relay.

The numeral 6 indicates a diode pickoff, 7 an amplifier, 8 is a thyratron relay, 9 is a differentiating circuit, 10 a second multivibrator, 11 a differentiating circuit, 12 a multivibrator and 13 and 14 are visual indicators.

The video control circuit 1 of Fig. 1 includes two stages of low amplification having D. C. restoration characteristics, in which a resistor 21 provides means for regulating the volume of the video signals originating in a pulse echo system receiver, not shown.

The numeral 101, in Fig. 2, is a graphical representation of the input to the video control circuit shown in Fig. 1; 114 is the transmitter pulse; 111 the vicinal returns; 112 random noise or microphonics; 113 a significant echo; and 114a the transmitter pulse which initiates a new cycle of operation on the next sweep. The output of the one shot multivibrator 2 is indicated by the numeral 102, and the duration of the variable negative square wave is indicated at 116 and 116a, a potentiometer 23 being provided for effecting the adjustment of said duration.

An interruptor switch 20 provides means for disabling the multivibrator circuits whenever necessary, to provide a test signal in the absence of other signals, said test signal being the transmitter pulse.

Referring now to Fig. 3 of the drawing, the numeral 18 shows the location of the pulse echo system, 15 is the excluded zone in which search is not desired, and 17 indicates an area of no significance to the operator. The numeral 16 indicates the zone in which a search is desired. For this purpose, an interruptor 24 is provided for putting into operation the second one-shot multivibrator 10, which is triggered by the trailing edge of the first square wave 102 differentiated by the circuit 9 to produce the pulse 117 in the wave form 106 of Fig. 2.

The square wave of negative polarity produced by the second multivibrator 10 is shown graphically at 107, and is of variable duration as shown by the dotted lines 118, 118a, said duration being controlled by a potentiometer 25 (Fig. 1) in series with the RC coupling between the discharge tubes comprising said second multivibrator 10. The numeral 26 indicates a scale calibrated to show distances corresponding to the duration of the square wave 107. The duration of this second negatively poled square wave will be seen to correspond with the zone indicated by 16 in Fig. 3.

At 11 of Fig. 1, means of differentiating the wave 118 is provided to produce the pulse 119 in graph 108 of Fig. 2, for triggering the third multivibrator 12, which is of the start-stop type to produce the negative square waves 120, 120a of graph 109, terminated by the transmitter pulse of the pulse echo system introduced through the wire 27.

The numeral 110 of Fig. 2 is a graphical representation of the voltages applied to the switch tube 4, wherein 121 and 121a correspond to the previously described zone 16, in which it is desirable to make the search, or by which it is desirable to maintain a limit of proximity to a determined area or obstacle.

In the operation of the switch tube 4, together with the improvements associated therewith as shown in Fig. 4, it will be understood that the numerals 101, 102, and 109 (Fig. 2) indicate the inputs to said switch tube, the numerals 43 and 47 indicate diodes, and 13a is a visual indicator tube.

With reference first to the inputs 102 and 109, it will be noticed that the resistances 44, 42 and 45 (Fig. 4) comprise a voltage divider in which the resistance 42 is greater than the resistance 44. Thus, the negative square wave input 109 will produce a greater negative voltage at 49 than an input of equal amplitude square wave, at 102 only. Such differences of voltage at 49 provide means of ascertaining a difference between the visual indicators of the tube 13 when the alarm actuator is working under normal operating conditions from when it is working under zone operation conditions. The tube 13 further indicates that the multivibrator 2 and the multivibrator 10 are operating.

The diode 43 with the components shown, operates as a negative D. C. restoration and provides a means of quenching any positive excursions, such as shown at 115 in Fig. 2, occurring at the trailing edges of the negative square waves 102 and 109. The diode 47 provides positive D. C. restoration of the video signal. The above mentioned diodes 43, 47 together serve to differentiate clearly between the positive and the negative excursions in the output of the switch tube 4 which are graphically represented in Fig. 2 by the numeral 103, in which 116b represents the block-out square wave, inverted, and 113a repeats the significant echo inverted. It will be clear that under conditions of zone operation, a large positive square wave will appear at 103 corresponding to the square wave 116, 116a inverted. It will also be clear by reference to the graph 110 of Fig. 2 that with a square wave of duration 121, the signal 113 would be blocked out in the switch tube 4, whereas with the application of a square wave of duration 121a, said signal would not be so blocked.

The output of switch tube 4 is applied to the quenching apparatus 5, which preferably comprises a triode unbiased with long time constant input. The triode quench circuit serves as a means of quenching the large positively poled square waves in the output of the switch tube 4 without affecting the response to the significant echo 113 of opposite polarity, as shown in graph 105 (Fig. 2). The output of the quenching circuit 5 is shown in the graph 104.

The operation of the diode pick-off 6 and the visual indicator tube 14, used in connection therewith, will be clearly understood with reference to Fig. 5, in which 6a is a diode, 70 one amplifier, 73 a rectifying diode, 14a a visual indicator tube, and 71 a final amplifier inverter.

The diode 6a (Fig. 5) is biased by means of the voltage divider 26 to conduct in the presence of a voltage of an amplitude greater than that of random noise. The resistor 60 in the cathode circuit of the diode 6a produces a voltage with the conduction of said diode. The voltage produced in the manner described above is amplified by the element 70, and D. C. restoration is provided by amplifier inverter 71. The visual indicator 14 (Fig. 1) serves as a means of facilitating the adjustment of the diode pick-off bias produced at 26.

It will thus be clear that under "no echo" conditions, the multivibrator 2 of Fig. 1 may be disabled by means of the switch 20, interrupting the trigger pulse originating in the modulator of the transmitter of the pulse echo system. When the output of the multivibrator 2 ceases, the transmitter pulse and vicinal returns will be admitted into the switch tube 4 of the alarm actuator, to provide sample signals of amplitude suitable for the adjustment of the bias level of the diode pick-off circuit 26. By means of this adjustment, the visual indicator 13 will provide means for adjusting the bias at 26 above the level of random noise, and the interruptor 20 will serve as means of adjusting said bias level below the amplitude of a sample of echo amplitude.

Finally, in Fig. 1, the numeral 8 has been shown as a thyratron relay biased to cut-off, but firing in presence of a signal of the amplitude of a significant echo return 113, and driving a relay for the actuation of any suitable alarm mechanism 3.

Sector exclusion

Figure 6:
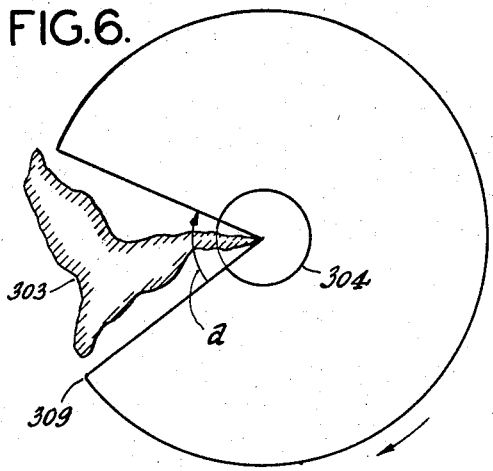
Fig. 6 is a diagrammatic view showing a particular sector and the excluded area.
Figure 7:
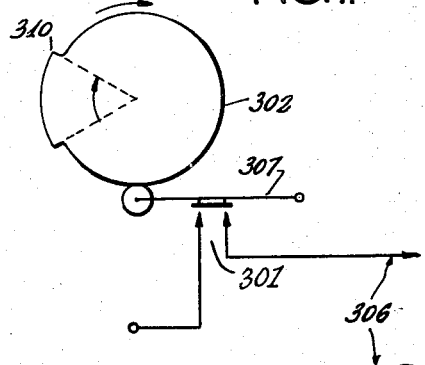
Fig. 7 is a diagrammatic view of a cam-operated switch for producing the sector exclusion shown in Fig. 6.

Another improvement is designated as sector exclusion, comprising means of excluding any predetermined sector of the whole area scanned by the pulse echo equipment. This feature will be more easily understood by reference to Fig. 6. An island 303 with the pulse echo device located at its extreme eastern extremity represents an area which would return echoes to the receiver of the pulse echo system, but such echoes are insignificant from an observation point of view. The device shown in Fig. 7 discloses mechanical means of excluding the aforementioned insignificant echoes from the device described in the original Patent No. 2,521,016, which provides for the extinction of echoes originating only in the local area designated as 304, Fig. 6. The mechanical means for excluding echoes in the sector a (Fig. 6) comprises a cam 302 (Fig. 7) actuated by servo extension from antenna scanning mechanism (504 and 509 in Fig. 9), such that said cam turns in synchronism with said antenna scanning mechanism, said cam actuating a switch 307. A suitable voltage applied at 301 will with the closure of said switch produce a bias at the output 306. It will be noted that the cam 302 provides closure of the switch 307 for the scanning time corresponding to the sector angle a shown in Fig. 6. That is, when the antenna is directed to the point 309 in Fig. 6, the point 310 of the cam actuates the switch 307. The output 306 is applied to the control grid of the switch tube 4, as disclosed in Fig. 1.

Zone blanking apparatus

Figure 8:
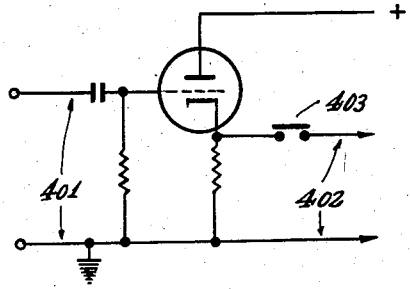
Fig. 8 is a circuit diagram of an apparatus for producing on the "scope," the indications in the zone where the apparatus is scanning.

Provision may be made in the indicator unit of the pulse echo system to provide a blanking bias applied to the cathode ray tube for any desired time. The repetition time of the pulse echo system provides for a range greater than the actual range employed to include range indications; for example the repetition cycle may be 700 cps., and the range of the equipment may be limited to forty miles and any indication falling outside said forty mile range, will be blanked by said blanking pulse. Indicator units also provide for close range operation and distant range. It may also be desirable to continue search on the distant range, while actually examining the close range. The device designated as "early-warning" fulfills this desideratum. If it is desirable to have the device register a signal falling within the range covered by the scope, the operator has means of closing the switch 403 in Fig. 8. The input 401 is then the aforementioned blanking voltage from the indicator unit; if on the other hand the operator wishes to observe beyond the range provided for by the indicator unit, he will open the switch 403, which will prevent the aforementioned blanking voltage from reaching the output 402. The output 402 is applied to the control grid of the aforementioned switch tube 4. Fig. 8 shows a cathode follower. Its purpose is to isolate the signal grid of the cathode ray tube of the indicator unit from any possible interference from the device as shown in Patent No. 2,521,061 and improvements herein disclosed. It is clear that any blanking voltage applied at 401 will be reflected in the output 402, and when the switch 403 is closed will be applied to the control grid of aforementioned switch tube 4.

Further, to insure the "failsafe" operation of said equipment, means is provided to install a normally closed relay in conjunction with filament and power circuits so that a current variation will close the circuit of a buzzer or other alerting means to indicate the failure or malfunction of the device as previously disclosed.

"Stop on target" means

Figure 9:
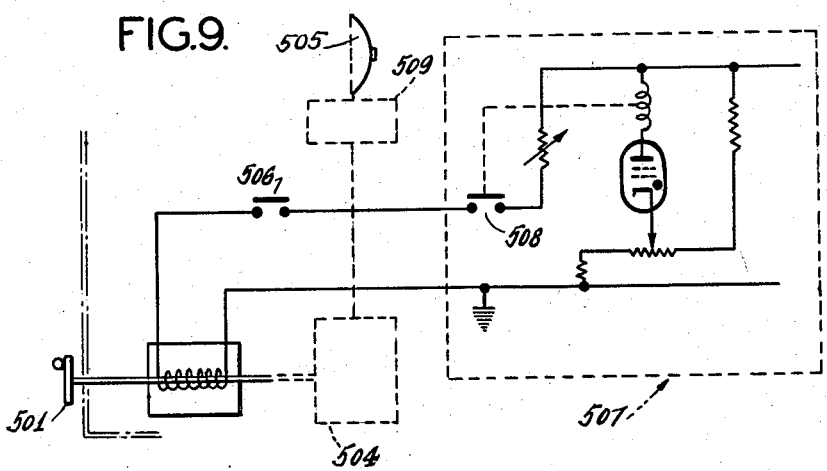
Fig. 9 is a circuit diagram of a modified form of apparatus for stopping the antenna "on the target," and thereby permitting the recording of bearing indications.

It is well known that the antenna of a pulse echo system is actuated by a mechanism which causes the antenna to rotate for scanning surrounding areas. By servo means, the rotation of the antenna may be repeated in the indicator unit for "plan" presentation of signals received, said servo repeater means being intended for the rotation of the sweep on the cathode ray tube, and thereby producing a visual image of the bearing of the object sighted relative to the pulse echo system, the position of which is then indicated by the center of the face of said cathode ray tube. It will be clear, that for alerting purposes, it is valuable to know the bearing of the object that has caused the thyratron of circuit 507 (Fig. 9) to fire for the actuation of a relay for the actuation of alerting means as disclosed in the said patent. It is known that indicator units of pulse echo systems are provided with manual means of rotating the antenna 505, said means comprising a crank 501 and shaft 504 connected to the servo system, as shown in Fig. 9. If this crank is pulled out, the automatic rotation is disabled, and the antenna will then move only as said crank 501 is rotated by hand. This enables the operator to examine signal, scan it, and fix its location.

The present improvement, herein disclosed, provides mechanical means to stop the antenna synchronously with the reception of a signal. This stopping means comprises solenoid means to pull out the aforedescribed crank 501, when the thyratron relay 508 is closed by the firing of the thyratron. A switch 506 is shown as the means of disabling the "stop-on target" means.

While there have been disclosed in this specification several forms in which the invention may be embodied, it is to be understood that these forms are shown for the purpose of illustration only, and that the invention is not to be limited to the specific disclosures, but may be modified and embodied in various forms, without departing from its spirit. In short, the invention includes all the modifications and embodiments coming within the scope of the following claims.

Having thus fully described the invention, what is claimed as new and for which it is desired to secure Letters Patent, is:

1. In an electronic alarm alerting apparatus of a pulse echo system having repetitive range scanning means including a rotating antenna, means operated coincidently with the beginning of each range scanning cycle to produce a first square-shaped voltage pulse, means time-controlled by the trailing edge of said first pulse to produce a second square-shaped voltage pulse of the same polarity as said first pulse, means time-controlled by the trailing edge of said second voltage pulse to produce a third square-shaped voltage pulse of the same polarity as that of the first and second square-shaped pulse, the termination of said third square-shaped pulse being coincident with the inception of the first square-shaped pulse, switch means to render inoperative said second and third square wave generating means, a switch tube responsive to said first and said third square-shaped pulses negatively polarized to block echo pulses received during the duration of said first and said third square-shaped pulses, an alarm means actuated by a relay, a thyratron for driving said relay and circuit means interconnecting said switch tube means and said thyratron relay means, said thyratron being triggered by echo pulses occurring during the time corresponding to the second of said square wave timing impulses whereby said alarm device will be actuated and remain actuated until manually released.

2. An electric alarm-actuating apparatus as defined in claim 1, in which provision is made of means for visually indicating the operation of said square wave multivibrators, said visual indicating means being responsive to the voltage changes occurring at the grid of said switch tube caused by the application of negative blocking voltages to said grid, said voltage changes being greater with the operation of all three of said multivibrators than it is with the operation of only said first multivibrator, said negative voltage falling to zero with the non-operation of the first of said multivibrators.

3. An alarm actuating alerting device as defined in claim 1, including means for excluding a sector of azimuth scanning, said excluding means consisting of servo-relay means operating in synchronism with the rotating antenna, and a cam operated switch means actuated by said servo-relay means, during the time corresponding to said sector for applying a bias voltage to the control grid of said switch tube.

4. An alarm actuating apparatus as defined in claim 1, in which means responsive to the echo signal for stopping the rotating antenna on the target which has produced the echo signal, comprising switch means operating concurrently with the thyratron-driven alarm relay.

5. An alarm actuating apparatus as defined in claim 1, in which pick-off means are provided in said circuit for suppressing background noise but permitting the passing of echo signals of amplitude greater than said background noise, said pick-off means consisting of a diode biased to be nonconductive in the presence of said background noise, but to be conductive in the presence of signals of greater than the average amplitude of said background noise, and means to amplify and render visible the signals passed by said diode pick-off means.

6. An alarm actuating apparatus as defined in claim 1, in which a quench circuit is provided in said circuit means to effect D. C. restoration of the signals reducing the amplitudes of the large square waves of positive polarity corresponding to the negative square wave inputs to the grid of said switch tube but leaving unaffected the admitted video signals of opposite polarity.

References Cited in the file of this patent
UNITED STATES PATENTS

| | | |
|---|---|---|
| 2,428,058 | Wise | Sept. 30, 1947 |
| 2,494,339 | Keister | Jan. 10, 1950 |
| 2,521,016 | Miller | Sept. 5, 1950 |
| 2,527,769 | Sinsheimer | Oct. 31, 1950 |

FOREIGN PATENTS

| | | |
|---|---|---|
| 640,504 | Great Britain | July 19, 1950 |